Feb. 23, 1965    A. M. REICHENBERGER    3,170,597
MATERIALS DISPENSER AND RECORDING MEANS
Filed Feb. 12, 1962
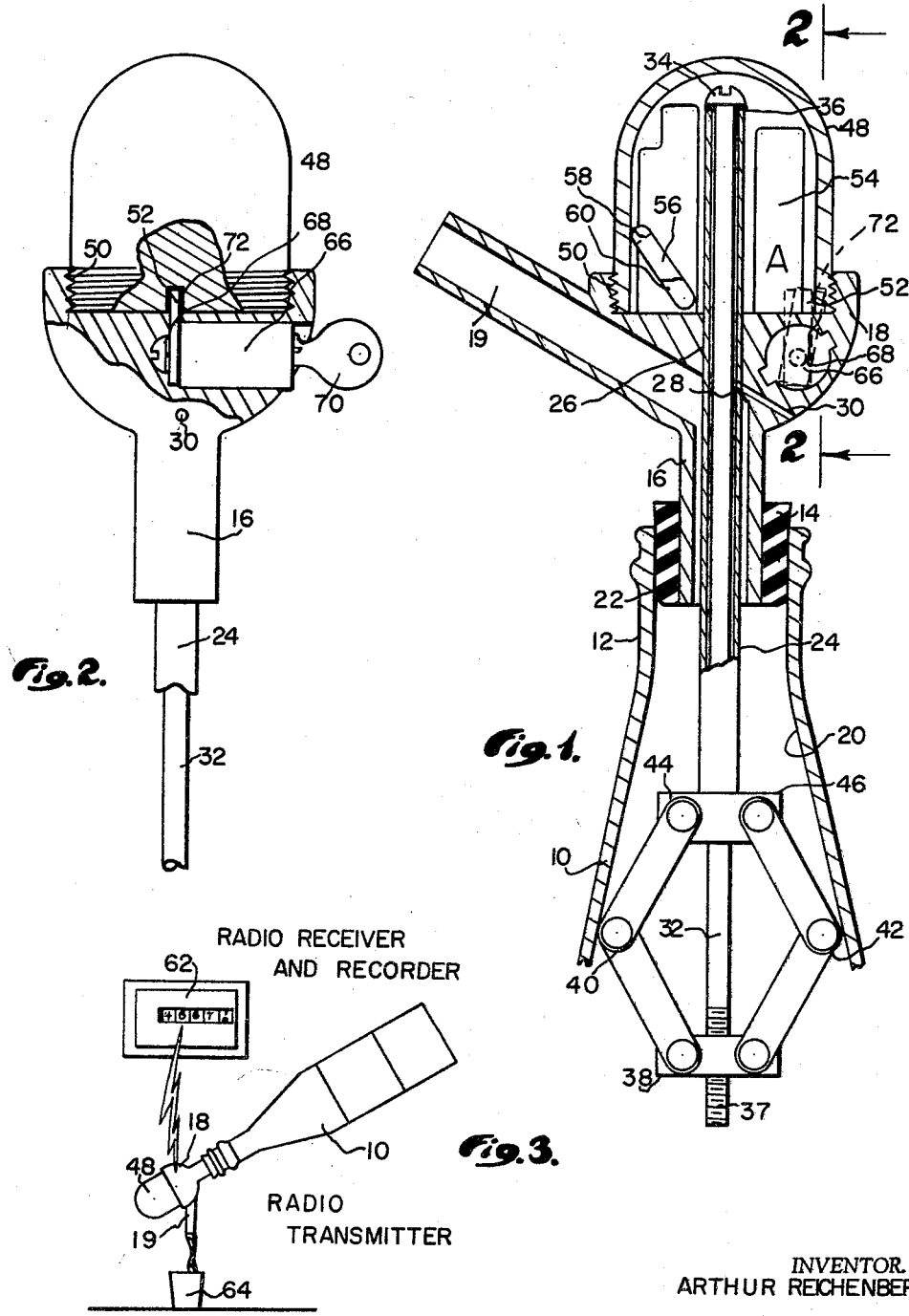
INVENTOR.
ARTHUR REICHENBERGER

3,170,597
MATERIALS DISPENSER AND RECORDING MEANS
Arthur M. Reichenberger, 4047 W. State, Phoenix, Ariz.
Filed Feb. 12, 1962, Ser. No. 172,564
7 Claims. (Cl. 222—36)

This invention relates to a materials dispenser and recording means and more particularly to a materials dispenser and recording means adapted, automatically, to record the amount of materials dispensed intermittently from a materials container.

In the dispensation of various bulk materials, such as liquors or any other material which may be dispensed in bulk from a container, it has been a problem automatically to maintain an inventory record with respect to receipts.

This problem has been particularly difficult to solve with respect to liquors poured from bottles during the production of mixed drinks and accordingly, it has been difficult to determine the efficiency of barkeepers.

Barkeepers who pour liquor from bottles, may have a tendency to overpour their liquor when making mixed drinks or they may fail to collect for such drinks and in some instances, through inadvertence, accident or mistakes, barkeepers are therefore inefficient.

Accordingly, it is an object of the present invention to provide a very simple, automatic and efficient materials dispenser and recording means which may readily be applied to the dispensation of various bulk materials from containers whereby an accurate record may be kept of the dispensation of such materials without inconvenience to the person dispensing such materials.

Another object of the invention is to provide a materials dispenser and recording means which is particularly adapted for use in automatically recording the dispensation of liquor from several liquor bottles during the production of mixed drinks at bars or the like.

Another object of the invention is to provide a materials dispenser and recording means having novel combination wherein a radio signal transmitter is responsive to a switch means activated by dispensation of materials from a container and wherein a radio receiver receives such signals and records them to thereby maintain a record of all materials dispensed from the said container.

Another object of the invention is to provide a materials dispenser and recording means comprising a novel means for retaining a radio transmitter in connection with a materials dispenser and for activating said radio transmitter by dispensation of materials from the container in order to send out a signal to a radio signal receiver and recorder for establishing a record of all materials dispensed from the container.

Further objects and advantages of the invention may be apparent from the following specification, appended claims, and accompanying drawings, in which:

FIG. 1 is a fragmentary axial sectional view of a liquor bottle or materials container showing a dispenser and radio transmitter in connection therewith and illustrating said dispenser and radio transmitter in axial section and further showing parts and portions in elevation to facilitate the illustration;

FIG. 2 is a fragmentary sectional view taken from the line 2—2 of FIG. 1; and

FIG. 3 is a diagrammatic view of a materials dispenser and recording means of the present invention showing material being dispensed from a container and illustrating a radio transmitter in connection with the dispenser sending a signal to a radio receiver and recorder, all in accordance with the present invention.

It is contemplated that the materials dispenser and recording means of the present invention may be used in connection with the dispensation of various materials in bulk form from various containers. As for example, the invention may be utilized in connection with the dispensation of liquor from bottles or may be used in connection with various containers of various sizes and configurations for use in recording the dispensation of various materials from such containers.

As shown in FIG. 1 of the drawings, a conventional liquor bottle 10 is provided with a conventional neck 12 wherein a resilient sleeve 14 supports a hollow stem 16 of a dispenser housing 18. The hollow stem 16 is supported internally of the resilient sleeve 14 which, in turn, is supported internally of the bottle neck 12. The hollow stem 16 communicates with a hollow dispenser spout 19 and also communicates with the interior 20 of the bottle 10.

Extending downwardly through the bore 22 of the hollow stem 16 is a tubular member 24. This tubular member 24 is disposed in a bore 26 of the housing 18 and is fused or otherwise fixed therein.

The hollow tubular member 24 is provided with an opening 28 in its side wall which communicates with an opening 30 in the housing 18 extending to atmosphere to provide an air bleed from atmosphere to the interior of the bottle 10.

Disposed internally of the hollow tubular member 24 is a draw bar 32 having a slotted head 34 abutted to an end 36 of the hollow tubular member 24. The draw bar 32 is provided with a threaded portion 37 screwthreaded in a nut 38 to which toggles 40 and 42 are pivotally connected. These toggles 40 and 42 are pivotally connected at their one ends to the nut 38 and are pivotally connected at their opposite ends to enlarged portions 44 and 46 carried at the normally inner end of the hollow tubular member 24.

When the draw bar 32 is tightened, screwthreadably, in the nut 38, the toggles 40 and 42 are extended into engagement with the interior of the bottle neck, at its converging portion, to retain the tubular member 24 and housing 18 in juxtaposition, as shown in FIG. 1 of the drawings.

The housing 18 is provided with a removable cap 48 which is hollow and provided with an externally screwthreaded skirt portion 50 engaged in an internal screwthreaded portion 52 of the housing 18. Thus, the cap 48 is secured to the housing 18 and encloses a radio transmitter 54 which is preferably a transistorized radio transmitter of very small compact configuration.

A conventional mercury switch 56 is in circuit with the transmitter 54 and the transmitter 54 is a self-powered transmitter employing a small battery (not shown) in the cap 48.

The mercury switch 56 is disposed with contacts 58 at one end thereof, disposed to be closed by mercury 60 when the bottle 10 is tilted into a position, as shown in FIG. 3 of the drawings. Thus, the switch 56 is responsive to dispensation of liquor or other materials from the spout 19 and the self-powered battery operated transmitter 54 is disposed to emit a signal to a radio receiver and recorder 62, as will be hereinafter described in detail.

The transmitter 54 is preferably arranged to emit an amplitude or pulse modulated signal, the rate of which may be determined by the type of material or liquor, so that liquor, for example, flowing out through the spout 19 into a glass 64 will be measured in accordance with the number of beeps, or pulses, sent out by the transmitter 54 during the flow of liquor into the glass 64.

Inasmuch as liquor flows at a given rate through a given size spout, a certain number of beeps, or pulses, from the radio transmitter will be received by the radio receiver and recorder and that particular number of beeps sent out during closed condition of the switch 56 will record accurately the amount of liquor dispensed into the glass 64.

The radio receiver and recorder 62 may be provided with various counting and recording mechanisms common to the electronic receiver and counter art. Accordingly, it will be appreciated by those skilled in the art that the transmitter is responsive to dispensation of material from the container 10, and/or several of them, and that the amount of material dispensed from each container 10 may be counted in accordance with the pulse modulated beep signal from each transmitter 54. However, it will be obvious to those skilled in the art that various combinations of dispensing mechanism may be utilized and be responsive to the dispensation of materials in order to transmit a signal to the radio receiver and recorder 62. As for example, it will be obvious to those skilled in the art that the conventional single jigger or double jigger measuring devices known in the dispensing art, particularly for dispensing liquor, may be operated to send out one signal in accordance with the closing of the switch to indicate the measured dispensation of one jigger of liquor. This may be received and recorded by the radio receiver 62 as a single signal equal to the respective measured amount dispensed from the bottle 10.

The radio receiver and recorder may be located in close proximity to a bar or other place from which liquors may be dispensed or adjacent to any emporium wherein bulk materials are dispensed from containers. Thus, an inventory of the materials may be automatically recorded and compared with receipts of the business.

As shown in FIGS. 1 and 2 of the drawings, a lock tumbler 66 is disposed in the housing 18 and is provided with a conventional latch bar 68. The lock tumbler 66 is actuated by a conventional key 70 and a latch bar 68 is thus moved into or out of a notch 72 in the skirt of the cap 48. Thus, the cap 48 is held against inadvertent removal whereby the transmitter 54, switch 56 and draw bar 32 are protected from damage or removal.

When it is desired to remove the cap 48, the latch bar 68 may be pivoted to a broken line position A, as shown in FIG. 1, and thus, it will be out of interference with the skirt notch 72, thereby permitting the cap 48 to be screwthreadably removed from the housing 18, whereupon the housing 18, together with the transmitter, may be transferred from one bottle to another as contents of the bottles are dispensed therefrom. It will be understood that when the draw bar 32 is screwthreadably actuated in one direction, the toggles 40 and 42 may be collapsed so that they may be slidably removed from the converging bottle neck 12.

As hereinbefore pointed out, it will be obvious to those skilled in the art that various modifications of the present invention may be resorted to in a manner limited only by a just interpretation of the following claims.

I claim:

1. In a materials dispenser and recording means, the combination of: a materials container; a radio signal transmitter; switch means responsive to dispensation of materials from said container; said radio transmitter responsive to operation of said switch means and thereby energized to send out a signal; and a radio receiver and recorder disposed to receive said signal and record the dispensation of materials from said container.

2. In a materials dispenser and recording means the combination of: a materials container; a radio signal transmitter; switch means responsive to dispensation of materials from said container; said radio transmitter responsive to operation of said switch means and thereby energized to send out a signal; and a radio receiver and recorder disposed to receive said signal and record the dispensation of materials from said container; said radio transmitter disposed to send out a modulated signal; a pouring spout for said container having a fixed pouring area disposed to pour materials from said container at a given rate.

3. In a materials dispenser and recording means the combination of: a materials container; a radio signal transmitter; switch means responsive to dispensation of materials from said container; said radio transmitter responsive to operation of said switch means and thereby energized to send out a signal; and a radio receiver and recorder disposed to receive said signal and record the dispensation of materials from said container; said radio transmitter disposed to send out a modulated signal; a pouring spout for said container having a fixed pouring area disposed to pour materials from said container at a given rate; said switch means and said transmitter coupled to said container; said switch means operably responsive to a tilting of said container and the resultant removal of materials therefrom.

4. In a materials dispenser and recording means the combination of: a materials container; a radio signal transmitter; switch means responsive to dispensation of materials from said container; said radio transmitter responsive to operation of said switch means and thereby energized to send out a signal; and a radio receiver and recorder disposed to receive said signal and record the dispensation of materials from said container; a housing secured to said container and enclosing said transmitter; said switch enclosed in said housing and responsive to a tilting action of said container; and a fixed pouring spout disposed to pour materials from said container.

5. In a materials dispenser and recording means the combination of: a materials container; a radio signal transmitter; switch means responsive to dispensation of materials from said container; said radio transmitter responsive to operation of said switch means and thereby energized to send out a signal; and a radio receiver and recorder disposed to receive said signal and record the dispensation of materials from said container; a housing secured to said container and enclosing said transmitter; said switch enclosed in said housing and a fixed pouring spout disposed to pour materials from said container; said housing having a removable cover over said transmitter and said switch; and means for locking said cover on said housing.

6. In a materials dispenser and recording means the combination of: a materials container; a radio signal transmitter; switch means responsive to dispensation of materials from said container; said radio transmitter responsive to operation of said switch means and thereby energized to send out a signal; and a radio receiver and recorder disposed to receive said signal and record the dispensation of materials from said container; a housing secured to said container and enclosing said transmitter; said switch enclosed in said housing and a fixed pouring spout disposed to pour materials from said container; said housing having a removable cover over said transmitter and said switch; and means for locking said cover on said housing; means for locking said housing on said container and enclosed by said cover.

7. In a materials dispenser and recording means the combination of: a materials container; a radio signal transmitter; switch means responsive to dispensation of materials from said container; said radio transmitter responsive to operation of said switch means and thereby energized to send out a signal; and a radio receiver and recorder disposed to receive said signal and record the dispensation of materials from said container; a housing secured to said container and enclosing said transmitter; said switch enclosed in said housing and a fixed pouring spout disposed to pour materials from said container; said housing having a removable cover over said transmitter and said switch; and means for locking said cover on said housing; means for locking said housing on said container and enclosed by said cover; said last mentioned means comprising screwthreaded means; said screwthreaded means having expandable mechanism disposed to expand internally of a converging bottle neck for preventing the removal of said housing therefrom.

References Cited by the Examiner
UNITED STATES PATENTS

| | | |
|---|---|---|
| 1,959,501 | 5/34 | Ross. |
| 2,566,669 | 9/51 | Lesnick. |
| 2,883,086 | 4/59 | Davison et al. |
| 3,083,909 | 4/63 | Glaser et al. |

LOUIS J. DEMBO, *Primary Examiner.*